(12) United States Patent
Carson et al.

(10) Patent No.: US 10,469,447 B2
(45) Date of Patent: Nov. 5, 2019

(54) NETWORK ACCESS GATEWAY

(71) Applicant: Schweitzer Engineering Laboratories, Inc., Pullman, WA (US)

(72) Inventors: Kevin L. Carson, Troy, ID (US); Thomas M. Bartman, Pottstown, PA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 985 days.

(21) Appl. No.: 14/658,621

(22) Filed: Mar. 16, 2015

(65) Prior Publication Data
US 2016/0277216 A1 Sep. 22, 2016

(51) Int. Cl.
*H04L 29/06* (2006.01)
*H04L 12/66* (2006.01)

(52) U.S. Cl.
CPC .......... *H04L 63/0227* (2013.01); *H04L 12/66* (2013.01)

(58) Field of Classification Search
CPC .. H04L 63/0209; H04L 63/0227; H04L 63/02
See application file for complete search history.

(56) References Cited

U.S. PATENT DOCUMENTS

| 5,490,134 A * | 2/1996 | Fernandes | H04L 29/06 340/3.1 |
| 2007/0100504 A1* | 5/2007 | Moxley | H02H 3/46 700/286 |
| 2007/0109098 A1* | 5/2007 | Siemon | H04L 63/0853 340/10.1 |
| 2007/0114987 A1* | 5/2007 | Kagan | G01R 22/063 324/142 |
| 2007/0147415 A1* | 6/2007 | Marusca | H04L 43/0817 370/465 |
| 2010/0002879 A1* | 1/2010 | Risley | H04L 63/0428 380/255 |
| 2010/0070638 A1* | 3/2010 | Bhatt | H04L 63/1441 709/229 |
| 2010/0231054 A1* | 9/2010 | Togawa | H04B 3/44 307/112 |
| 2012/0233296 A1* | 9/2012 | Wimmer | H02J 13/0086 709/220 |

(Continued)

*Primary Examiner* — Xavier Szewai Wong
(74) *Attorney, Agent, or Firm* — Jared L. Cherry

(57) ABSTRACT

The present disclosure pertains to systems and methods for utilizing network access gateways to control access to devices or sub-networks. More particularly, but not exclusively, the present disclosure describes network access gateways configured to enable or disable communications circuits in a communication path or alter a network topology. In one embodiment, a network access gateway may include a first communication port, a second communication port, and a control port. Control logic may be in communication with the first communication port, the second communication port, and the control port. Further, the control logic may be configured to interrupt electrical communication between the first communication port and the second communication port based on input received from the control port in a first state, and to enable electrical communication between the first communication port and the second communication port based on input received from the control port in a second state.

26 Claims, 9 Drawing Sheets

(56) References Cited

U.S. PATENT DOCUMENTS

| | | | | |
|---|---|---|---|---|
| 2012/0304279 A1* | 11/2012 | Hargis | ................ | H04L 63/0209 |
| | | | | 726/14 |
| 2013/0031201 A1* | 1/2013 | Kagan | .................... | G01D 4/004 |
| | | | | 709/213 |
| 2013/0105082 A1* | 5/2013 | Melikyan | .......... | H01J 37/32183 |
| | | | | 156/345.28 |
| 2013/0227323 A1* | 8/2013 | Stafford | ............. | H04N 21/4436 |
| | | | | 713/323 |
| 2013/0271016 A1* | 10/2013 | Shuy | ................. | H05B 33/0806 |
| | | | | 315/159 |
| 2015/0113125 A1* | 4/2015 | Chamberlin | ........ | H04L 63/0209 |
| | | | | 709/224 |
| 2016/0094578 A1* | 3/2016 | McQuillan | .......... | H04L 63/1433 |
| | | | | 726/23 |

* cited by examiner

NETWORK ACCESS GATEWAY

TECHNICAL FIELD

This disclosure relates to systems and methods for utilizing network access gateways to control access to devices or subnetworks. More particularly, but not exclusively, the present disclosure describes network access gateways configured to enable or disable communications circuits in a communication path or alter a network topology.

BRIEF DESCRIPTION OF THE DRAWINGS

Non-limiting and non-exhaustive embodiments of the disclosure are described, including various embodiments of the disclosure, with reference to the figures, in which.

DETAILED DESCRIPTION

Figure 1:
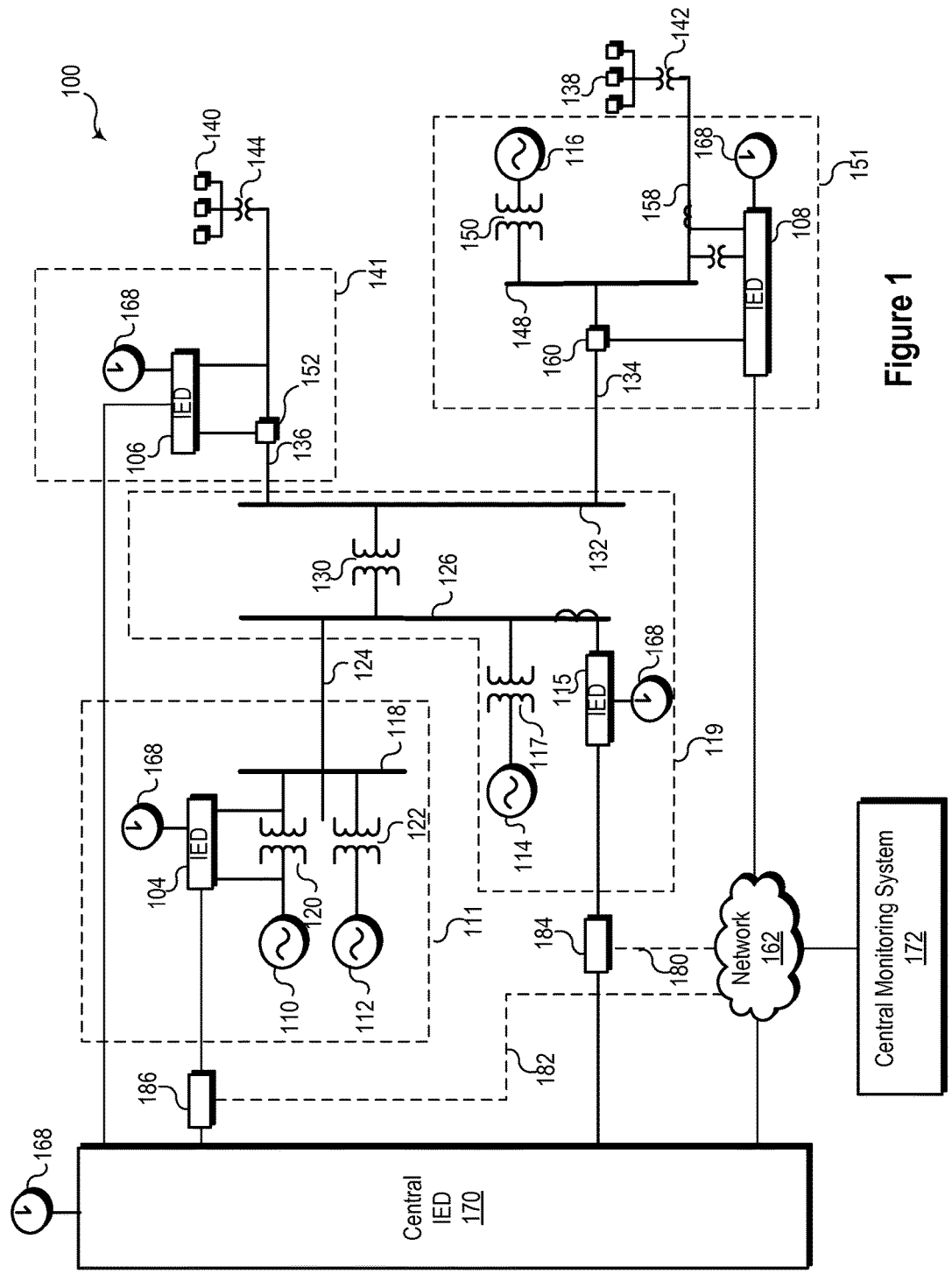
FIG. 1 illustrates an example of an embodiment of a simplified one-line diagram of an electric power delivery system with various substations consistent with embodiments of the present disclosure.

The present disclosure pertains to various systems and methods relating to network access gateways. In various embodiments, the network access gateways consistent with the present disclosure may enable or disable communication circuits, which are designed to enable or disable a communication path or re-route a topology. Multiple network access gateways consistent with the present disclosure may enable a variety of security scenarios.

Various advantages may be realized by connecting control systems to networks; however, security concerns present countervailing concerns. Various systems and methods disclosed herein may help to ameliorate certain security concerns while still achieving certain advantages associated with connecting control systems to networks. In various embodiments, the systems and methods disclosed herein may be utilized in action with electric power distribution systems. In particular, network access gateways consistent with the present disclosure may create an "air-gap" between a control system and an un-trusted network. The "air-gap" may be closed to permit network access as necessary to achieve the advantages associated with connecting the control system to the network.

Various systems and methods disclosed herein may be used to selectively sever or isolate a network path in the event of a cyber-intrusion. In some embodiments, high speed and high frequency relays specifically designed for high speed LAN network communications may be used to selectively enable and disable a communication channel. Such high speed relays may be placed in the communication pathway of an Ethernet link to create the "air gap" between a secure network and an insecure network. Various embodiments of the present disclosure may be remotely or locally operated to break and make the physical connection of a device. Various embodiments consistent with the present disclosure may include a contact input for controlling from an automation controller or programmable logic controller. The device has a contact output for the status of the Ethernet connection. The device may include a local pushbutton for changing the state of the Ethernet link. In some embodiments, an indicator may provide a visible representation of the status of the communication link.

In addition to the switching circuitry, various embodiments may also utilize an opto-isolated input for control. In some embodiments, a contact input may be disposed in parallel to a pushbutton switch that may be used for local operation. A visual indicator may be provided that shows the status of the link. In one embodiment, the visual indicator may be embodied as a vertically stacked dual LED indicator. One color (e.g., red) may indicate that the communication link is enabled while another color (e.g., green) may indicate that the communication link is disabled.

Systems and methods consistent with the present disclosure may also provide for increased security for engineering access to sensitive equipment. Specifically, in various embodiments engineering access may be selectively disabled, therefore reducing the opportunity for an authorized access. According to one embodiment, engineering access may be enabled and disabled according to a schedule. In other embodiments, engineering access may be enabled or disabled using another communication path. In one specific embodiment a Supervisory Control and Data Access (SCADA) system may be used to manually enable or disable engineering access. By selectively allowing engineering access to equipment during maintenance periods according to a pre-programmed schedule in which work through the network is allowed or by manual operation of the relay, the attack window (i.e., the time that a network is reachable) is greatly decreased.

The embodiments of the disclosure will be best understood by reference to the drawings, wherein like parts are designated by like numerals throughout. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

In some cases, well-known features, structures or operations are not shown or described in detail. Furthermore, the described features, structures, or operations may be combined in any suitable manner in one or more embodiments. It will also be readily understood that the components of the embodiments as generally described and illustrated in the figures herein could be arranged and designed in a wide variety of different configurations.

Several aspects of the embodiments described will be illustrated as software modules or components. As used herein, a software module or component may include any type of computer instruction or computer executable code located within a memory device and/or transmitted as electronic signals over a system bus or wired or wireless network. A software module or component may, for instance, comprise one or more physical or logical blocks of computer instructions, which may be organized as a routine, program, object, component, data structure, etc. that performs one or more tasks or implements particular abstract data types.

In certain embodiments, a particular software module or component may comprise disparate instructions stored in different locations of a memory device, which together implement the described functionality of the module. Indeed, a module or component may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product including a non-transitory computer and/or machine-readable medium having stored thereon instructions that may be used to program a computer (or other electronic device) to perform processes described herein. For example, a non-transitory computer-readable medium may store instructions that, when executed by a processor of a computer system, cause the processor to perform certain methods disclosed herein. The non-transitory computer-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of media/machine-readable medium suitable for storing electronic and/or processor executable instructions.

FIG. 1 illustrates an example of an embodiment of a simplified one-line diagram of an electric power delivery system 100 with various substations consistent with embodiments of the present disclosure. Electric power delivery system 100 may be configured to generate, transmit, and distribute electric energy to loads. Electric power delivery systems may include equipment, such as electric generators (e.g., generators 110, 112, 114, and 116), power transformers (e.g., transformers 117, 120, 122, 130, 142, 144 and 150), power transmission and delivery lines (e.g., lines 124, 134, and 158), circuit breakers (e.g., breakers 152 and 160), busses (e.g., busses 118, 126, 132, and 148), loads (e.g., loads 140, and 138) and the like. A variety of other types of equipment may also be included in electric power delivery system 100, such as voltage regulators, capacitor banks, and a variety of other types of equipment.

Substation 119 may include a generator 114, which may be a distributed generator, and which may be connected to bus 126 through step-up transformer 117. Bus 126 may be connected to a distribution bus 132 via a step-down transformer 130. Various distribution lines 136 and 134 may be connected to distribution bus 132. Distribution line 136 may lead to substation 141 where the line is monitored and/or controlled using IED 106, which may selectively open and close breaker 152. Load 140 may be fed from distribution line 136. Further step-down transformer 144 in communication with distribution bus 132 via distribution line 136 may be used to step down a voltage for consumption by load 140.

Distribution line 134 may lead to substation 151, and deliver electric power to bus 148. Bus 148 may also receive electric power from distributed generator 116 via transformer 150. Distribution line 158 may deliver electric power from bus 148 to load 138, and may include further step-down transformer 142. Circuit breaker 160 may be used to selectively connect bus 148 to distribution line 134. IED 108 may be used to monitor and/or control circuit breaker 160 as well as distribution line 158.

Electric power delivery system 100 may be monitored, controlled, automated, and/or protected using intelligent electronic devices (IEDs), such as IEDs 104, 106, 108, 115, and 170, and a central monitoring system 172. In general, IEDs in an electric power generation and transmission system may be used for protection, control, automation, and/or monitoring of equipment in the system. For example, IEDs may be used to monitor equipment of many types, including electric transmission lines, electric distribution lines, current transformers, buses, switches, circuit breakers, reclosers, transformers, autotransformers, tap changers, voltage regulators, capacitor banks, generators, motors, pumps, compressors, valves, and a variety of other types of monitored equipment.

As used herein, an IED (such as IEDs 104, 106, 108, 115, and 170) may refer to any microprocessor-based device that monitors, controls, automates, and/or protects monitored equipment within system 100. Such devices may include, for example, remote terminal units, differential relays, distance relays, directional relays, feeder relays, overcurrent relays, voltage regulator controls, voltage relays, breaker failure relays, generator relays, motor relays, automation controllers, bay controllers, meters, recloser controls, communications processors, computing platforms, programmable logic controllers (PLCs), programmable automation controllers, input and output modules, and the like. The term IED may be used to describe an individual IED or a system comprising multiple IEDs.

A common time signal may be distributed throughout system 100. Utilizing a common or universal time source may ensure that IEDs have a synchronized time signal that can be used to generate time synchronized data, such as synchrophasors. In various embodiments, IEDs 104, 106, 108, 115, 170 may receive a common time signal 168. The time signal may be distributed in system 100 using a communications network 162 or using a common time source, such as a Global Navigation Satellite System ("GNSS"), or the like.

According to various embodiments, central monitoring system 172 may comprise one or more of a variety of types of systems. For example, central monitoring system 172 may include a supervisory control and data acquisition (SCADA) system and/or a wide area control and situational awareness (WACSA) system. A central IED 170 may be in communication with IEDs 104, 106, 108, and 115. IEDs 104, 106, 108 and 115 may be remote from the central IED 170, and may communicate over various media such as a direct communication from IED 106 or over a wide-area communications network 162. According to various embodiments, certain IEDs may be in direct communication with other IEDs (e.g., IED 104 is in direct communication with central IED 170) or may be in communication via a communication network 162 (e.g., IED 108 is in communication with central IED 170 via communication network 162).

Communication via network 162 may be facilitated by networking devices including, but not limited to, multiplexers, routers, hubs, gateways, firewalls, and switches. In some embodiments, IEDs and network devices may comprise physically distinct devices. In other embodiments, IEDs and network devices may be composite devices, or may be configured in a variety of ways to perform overlapping functions. IEDs and network devices may comprise multi-function hardware (e.g., processors, computer-readable storage media, communications interfaces, etc.) that can be utilized in order to perform a variety of tasks that pertain to network communications and/or to operation of equipment within system 100.

Network 162 may include various network access gateways 184, 186 that may selectively enable communication lines 180, 182. Communication lines 180, 182 may be activated and utilized in various circumstances. For example, in the event of a malfunction of central IED 170, communication may be redirected through communication lines 180, 182 so that central monitoring system 172 may continue to receive data from substations 111 and 119. In another example, communication lines 180, 182 may be deactivated in the event of a cyber attack so that substations 111 and 119 are inaccessible via network 162. Using network access gateways 184, 186 the topology of network communications may be reconfigured as needed to respond to existing conditions within system 100.

Figure 2:
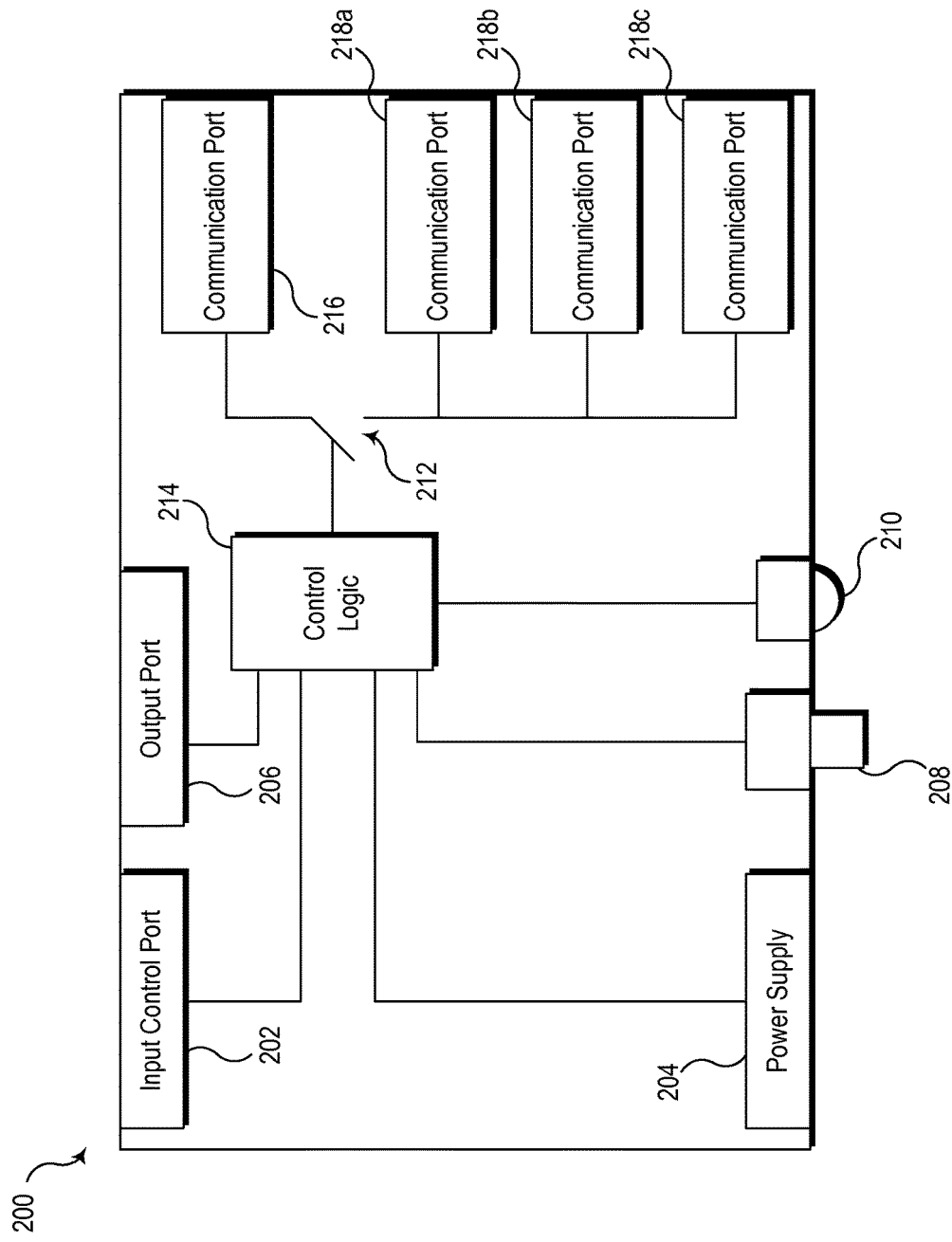
FIG. 2 illustrates a functional block diagram of a network access gateway consistent with embodiments of the present disclosure.

FIG. 2 illustrates a functional block diagram of a network access gateway 200 consistent with embodiments of the present disclosure. Network access gateway 200 may selectively enable or disable communication between communication ports 216 and 218a, 218b, and 218c. Communication ports 216, 218a-c may be embodied as Ethernet ports, fiber-optic ports, serial ports, radio communication ports, parallel ports, USB ports, IEEE 1394 ports, and other types of communication ports. In various embodiments, more or fewer communication may be included with network access gateway 200.

A switch 212 disposed between communication ports 216, 218 may selectively enable or disable an electrical connection between the ports. In some embodiments, the switch 212 creates an "air gap" between communication ports 216, 218. In one specific implementation, switch 212 may be embodied as a solid state relay. In another specific embodiment, switch 212 may be embodied as a Mini High Frequency Relay, Part No. G6K-RF, available from Omron Electronic Components LLC of Hoffman Estates, Ill. In other embodiments, switch 212 may selectively enable or disable communication without creating a physical separation between communication ports 216, 218. For example, switch 212 may comprise a plurality of transistors configured to operate the saturation region to enable communication between the communication ports 216, 218 and to operate in the cutoff region to disable communication between ports.

Switch 212 may be controlled by control logic 214. In various embodiments, control logic 214 may be embodied using only hardware. In other words, control logic 214 may be embodied without any software or firmware modules that may be vulnerable to cyberattacks. FIG. 3 illustrates one specific embodiment of a hardware only implementation of control logic that may be utilized in connection with various embodiments consistent with the present disclosure. Returning to a discussion of FIG. 2, a variety of other implementations of control logic 214 are also contemplated, including implementations using application-specific integrated circuits, field programmable gate arrays, and software or firmware-enabled devices.

Control logic 214 may receive input from an input control port 202 and provide an output to an output port 206. The input received from input control port 202 may control whether switch 212 enables or disables communication between communication ports 216 and 218. In some embodiments consistent with the present disclosure, input control port 202 may be embodied as a contact input that is configured to receive input from a SCADA system, and to thereby permit network access gateway 200 to be remotely controlled by the SCADA system. By permitting remote operation through a SCADA system (or other private communication system), a cyber attacker would need to obtain unauthorized access to a SCADA system to enable the network access gateway 200 before being able to attempt to obtain unauthorized access to a secure network in communication with the network access gateway 200. In other embodiments, input control port 202 may comprise a variety of types of ports, including a serial port, a parallel port, a USB port, an IEEE 1394 port, and the like.

Output port 206 may be configured to mirror a signal received on input control port 202 to permit a plurality of network access gateways 200 to operate collectively. In some embodiments, output port 206 may be used to "daisy chain" a number of network access gateways 200 together. Output port 206 may be embodied using any of the technologies described above in connection with input control port 202. Additionally, output port 206 may provide a status signal to an indicator, annunciator, or an alarm at a point of consolidation of I/O from a plurality of network access gateways. A logical monitor of these states is a central SCADA system, which displays the state of open or closed gateways on an HMI display. In the case of a SCADA system which has dedicated I/O to monitor inputs and maintain a state table of connections, an accurate view of network communications paths is rendered to the control displays for the communication or security officer. In the case of an operation to open the communication path, said SCADA system, which has dedicated I/O to many gateways, may originate a pulse across all the local SCADA system outputs which connect to gateway input ports 202 to effect an operation to one of the two binary states (i.e., open or closed). This operation may cause a corresponding pulse from the output ports 206 back to the SCADA system and the network display will be correspondingly updated.

A manual mode selector 208 may permit a user with physical access to network access gateway 200 to change an operating mode of the network access gateway 200. In one embodiment, pressing mode selector 208 may cause the network access gateway 200 to change from a transmitting mode to a non-transmitting mode and vice versa. In other embodiments, the manual mode selector 208 may be embodied as a switch or other similar device.

A mode indicator 210 may be configured to provide a visual indication of the status of network access gateway 200. In one specific embodiment, mode indicator 210 may be embodied as a bicolor LED. One color may indicate that the communication path between communication ports 216, 218 is enabled, while the other color may indicate that the communication path is disabled.

A power supply 204 may provide electrical energy to network access gateway 200. In some embodiments, power supply 204 may be embodied as a power connection configured to receive a supply of power from an external source. In other embodiments power supply 204 may also include a battery so that network access gateway 200 may continue to operate without regard to the status of an external power supply. Still further in some embodiments electrical power may be received from one or more ports (e.g., communication ports 216, 218 or input control port 202). In one specific embodiment, one or more communication ports 216, 218 may comprise a power-over-Ethernet port.

Figure 3A:
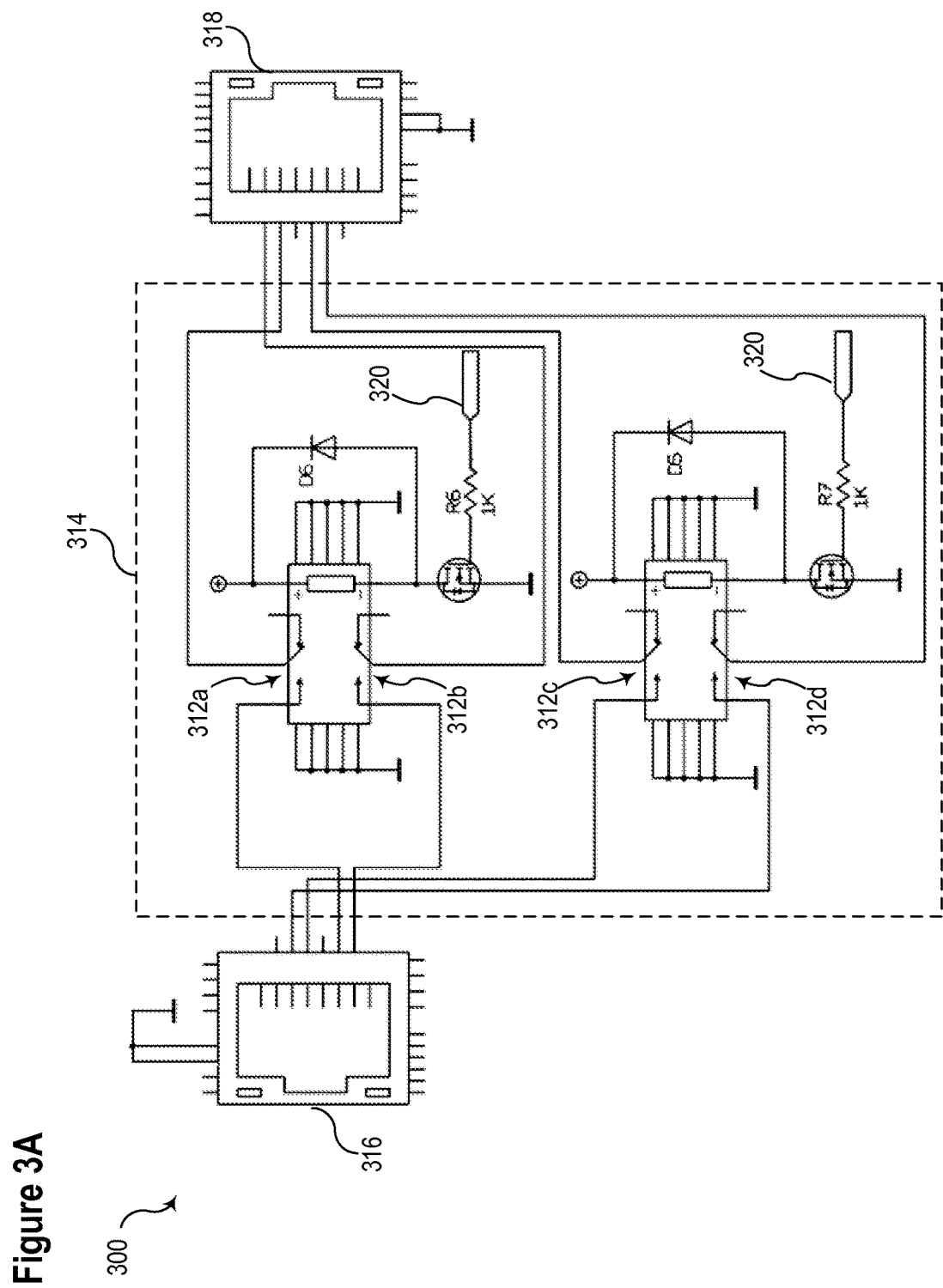
FIG. 3A illustrates a schematic view of one embodiment of a network access gateway consistent with embodiments of the present disclosure.

FIG. 3A illustrates a schematic view of one embodiment of a network access gateway 300 consistent with embodiments of the present disclosure. In the illustrated embodiment, network access gateway 300 includes two Ethernet communication ports 316, 318. Control logic 314 is disposed between Ethernet communication ports 316, 318 and is configured to selectively enable and disable communication between the ports. A plurality of switches 312a-d may be controlled by a latch signal 320 to selectively enable communication or to create an "air gap" between communication ports 316, 318. When switches 312a-d are closed, communication between ports 316, 318 is enabled.

Figure 3B:
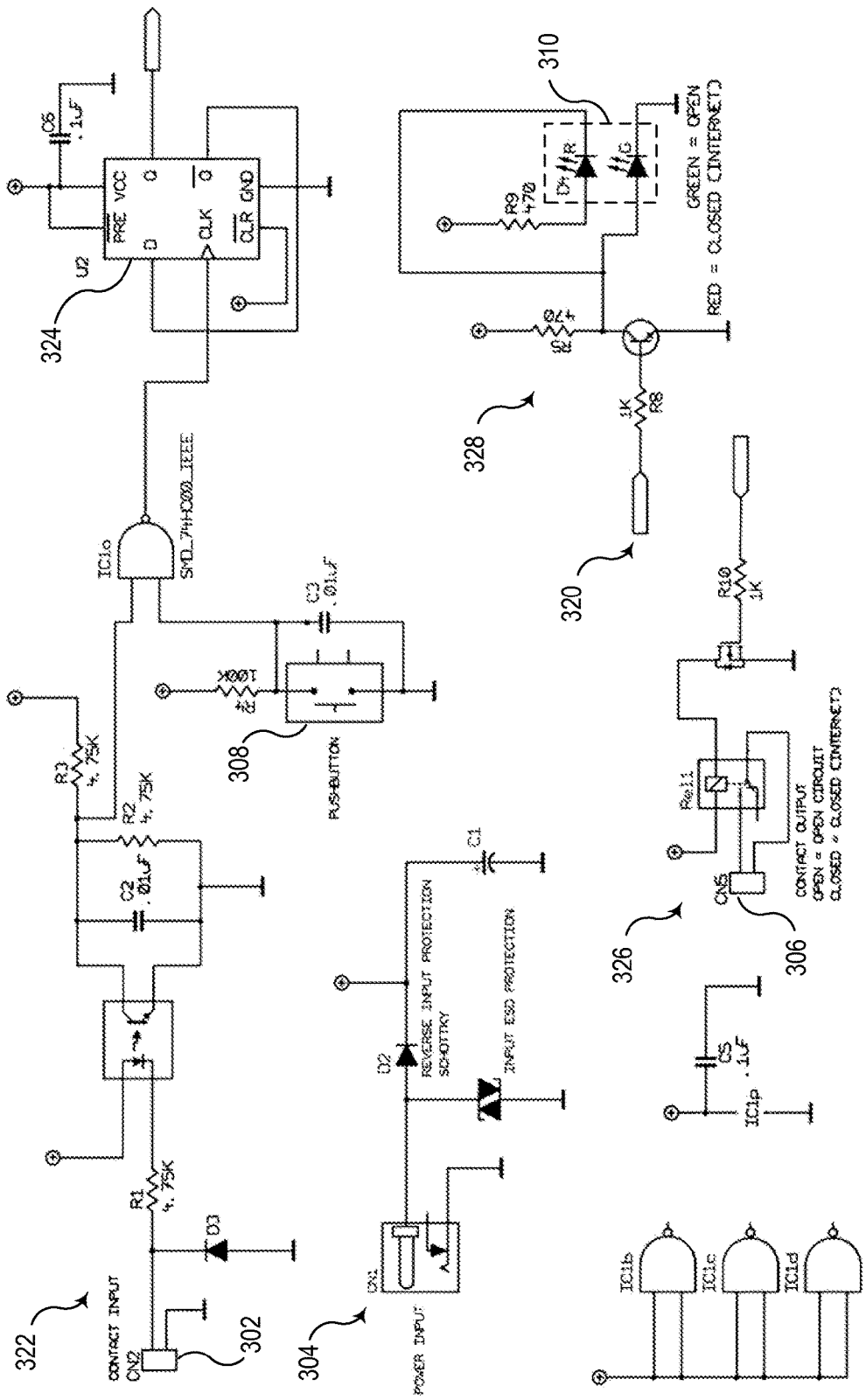
FIG. 3B illustrates a schematic view of additional elements of the network access gateway illustrated in FIG. 3A.

FIG. 3B illustrates a schematic view of additional elements of the network access gateway 300 illustrated in FIG. 3A. A latch generating circuit 322 may generate the latch signal 320 utilized in FIG. 3A to control the plurality of switches 312a-d. Latch generating circuit 322 may receive input from a contact input 302 and a mode selector 308. In the illustrated embodiment, the mode selector 308 comprises a pushbutton switch. The combined inputs of mode selector 308 and contact input 302 are provided to a DQ flip-flop 324. The latch signal 320 is generated by the DQ flip-flop 324.

FIG. 3B also illustrates a contact output circuit 326 and a visual indicator circuit 328 that are each controlled by the latch signal 320. More specifically, the contact output circuit 326 may activate the contact output 306 based on the latch signal 320. In this way, the contact output 306 may be used to daisy chain network access gateway 300 and other network access gateways (not shown). The visual indicator circuit 328 may selectively activate one of a red diode and a green diode based on the latch signal 320. The red diode and green diode together may comprise a visual indicator 310. In the illustrated embodiment, the green diode indicates that the network access gateway 300 is in an open condition (i.e., communication between ports 316 and 318 is disabled), while the red diode indicates that the network access gateway is in a closed condition (i.e., communication between ports 316 and 318 is enabled). A power supply circuit 304 may be connected to a power source and may supply power to the other circuits in the system.

Figure 4B:
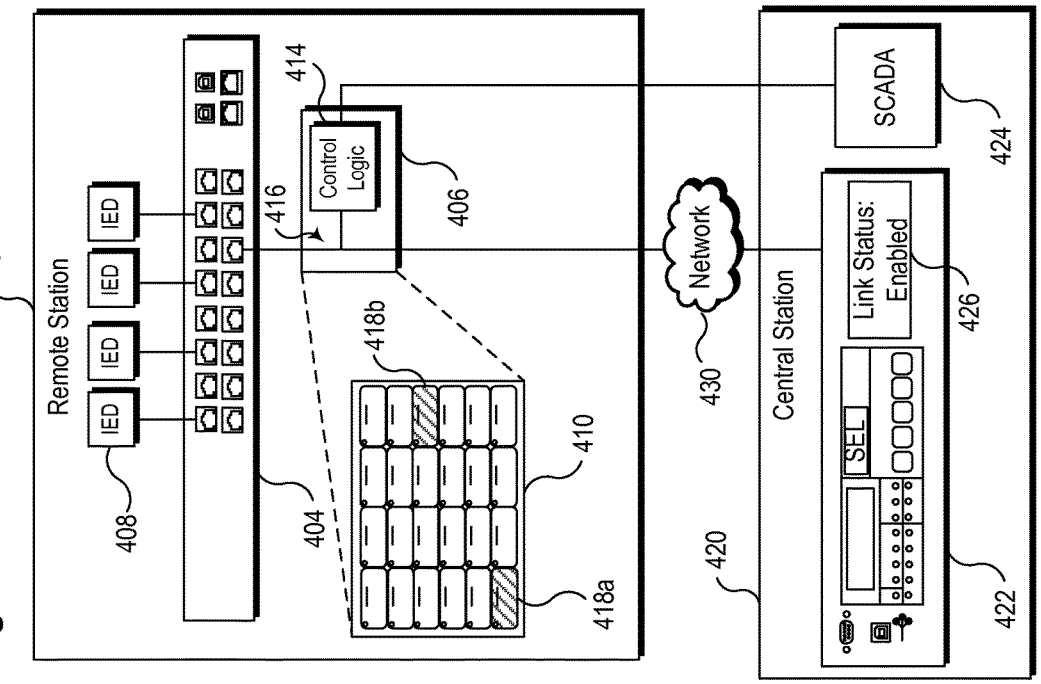
FIG. 4B illustrates an exemplary configuration in which engineering access between the central station and the remote station illustrated in FIG. 4A is selectively enabled based on the schedule.
Figure 4A:
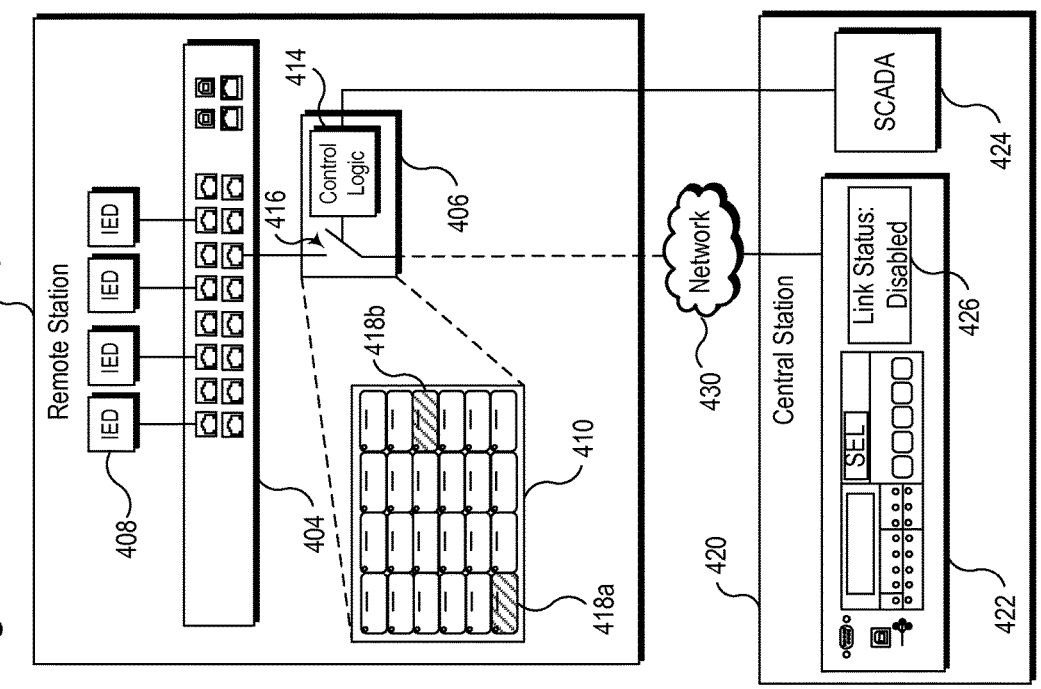
FIG. 4A illustrates an exemplary configuration in which engineering access between a central station and a remote station is selectively disabled based on a schedule.

FIG. 4A illustrates an exemplary configuration in which communication between a central station 420 and a remote station 402 across a network 430 is selectively disabled based on a schedule 410. Remote station 402 may include a plurality of IEDs 408 configured to monitor and control equipment in an electric power distribution system. The plurality of IEDs 408 may be connected to a switch 404.

A network access gateway 406 may be in connection with switch 404 and a network 430. Network access gateway 406 may selectively enable and disable communication with network 430. The network access gateway 406 may include control logic 414 configured to actuate a switch 416 disposed between switch 404 and network 430. In some embodiments, switch 416 may create an "air gap" in the communication channel between switch 404 and network 430. Network access gateway 406 may receive a signal from a SCADA system 424.

In the illustrated embodiment, network access gateway 406 may enable communication network 430 according to a schedule 410. Among other things, engineering access to the plurality of IEDs 408 may be routed through network 430. Schedule 410 may represent a 24 hour period in which each hour is represented by a box. Shaded boxes 418a, 418b may represent access windows during which communication with network 430 is enabled. In various embodiments a schedule may be fixed, may be random, or may be a combination of fixed and random elements. Reducing the amount of time that remote station 402 is connected to network 430 may reduce the opportunity for an authorized access to equipment within remote station 402; however, certain benefits associated with remote management may still be realized as a result of network conductivity during access windows 418a, or 418b.

At the central station 420, an access controller 422 may be configured to identify the status 426 of the network link with remote station 402. In some embodiments, a SCADA system 424 may be able to remotely control network access gateway 406 without regard to schedule 410. Such control may allow for flexibility in addressing real-time conditions within remote station 402 without requiring a physical presence at remote station 402.

FIG. 4B illustrates an exemplary configuration in which communication between central station 420 and remote station 402 across network 430 is selectively enabled based on the schedule 410. Network access gateway 406 may enable communication by closing switch 416. The status 426 displayed by access controller 422 may provide an indication that network communication with remote station 402 is enabled.

Figure 5A:
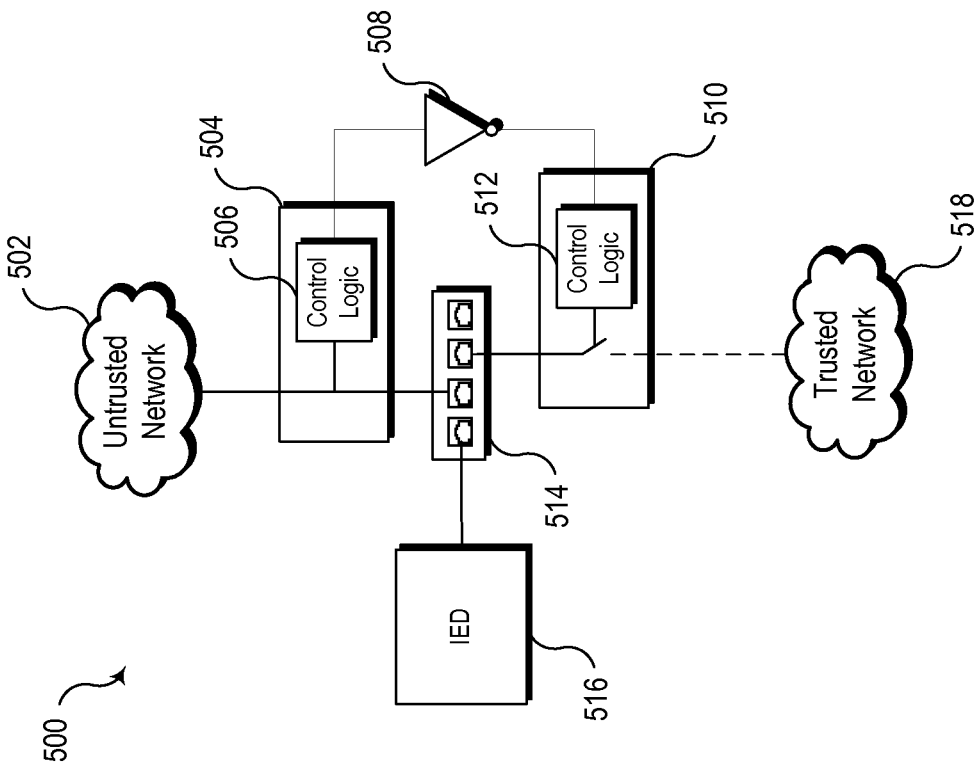
FIG. 5A illustrates a block diagram of a system in which an IED is limited exclusively to communication with a trusted network using network access gateways consistent with embodiments of the present disclosure.

FIG. 5A illustrates a block diagram of a system 500 in which an IED 516 is limited exclusively to communication with a trusted network 518 using network access gateways 504, 510 consistent with embodiments of the present disclosure. IED 516 is in communication with a switch 514, which in turn is in communication with network access gateway 504 and network access gateway 510. Network access gateway 504 is in communication with an untrusted network 502, while network access gateway 510 is in communication with a trusted network 518. A logical not gate 508 disposed between control logic 506 and 512, which are associated with network access gateway 504 and network access gateway 510, respectively, may avoid simultaneous communication between untrusted network 502 and trusted network 518.

Figure 5B:
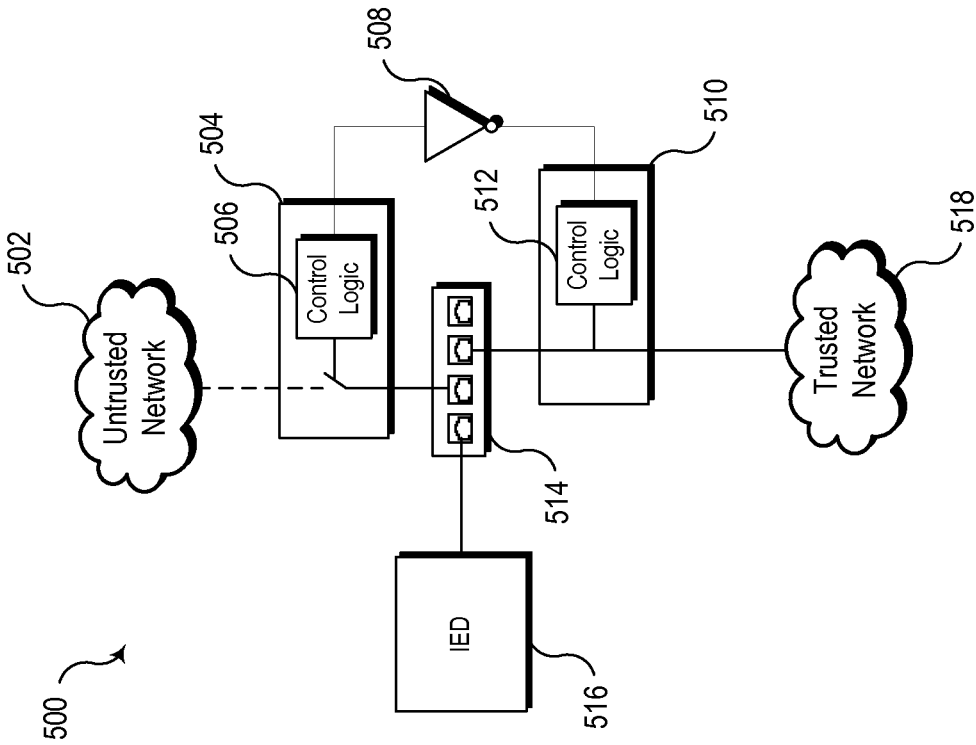
FIG. 5B illustrates a block diagram of the system illustrated in FIG. 5A, in which the IED is limited exclusively to communication with an untrusted network consistent with embodiments of the present disclosure.

FIG. 5B illustrates a block diagram of the system illustrated in FIG. 5A, in which IED 516 is limited exclusively to communication with the untrusted network 502 consistent with embodiments of the present disclosure. The configuration illustrated in FIG. 5A and FIG. 5B may be analogized to an "airlock." In the configuration illustrated in FIG. 5A, the trusted network 518 is isolated and remains secure from attacks from untrusted network 502. In the configuration illustrated in FIG. 5B, the IED 516 may communicate with the untrusted network 502. In such a configuration, IED 516 may receive, for example, periodic software patches, firmware updates, and software changes that are required for many systems. Accordingly, the advantages of maintaining the security of trusted network 518 may be realized while also realizing the advantages of being able to connect IED 516 to untrusted network 502 for various reasons.

Figure 6:
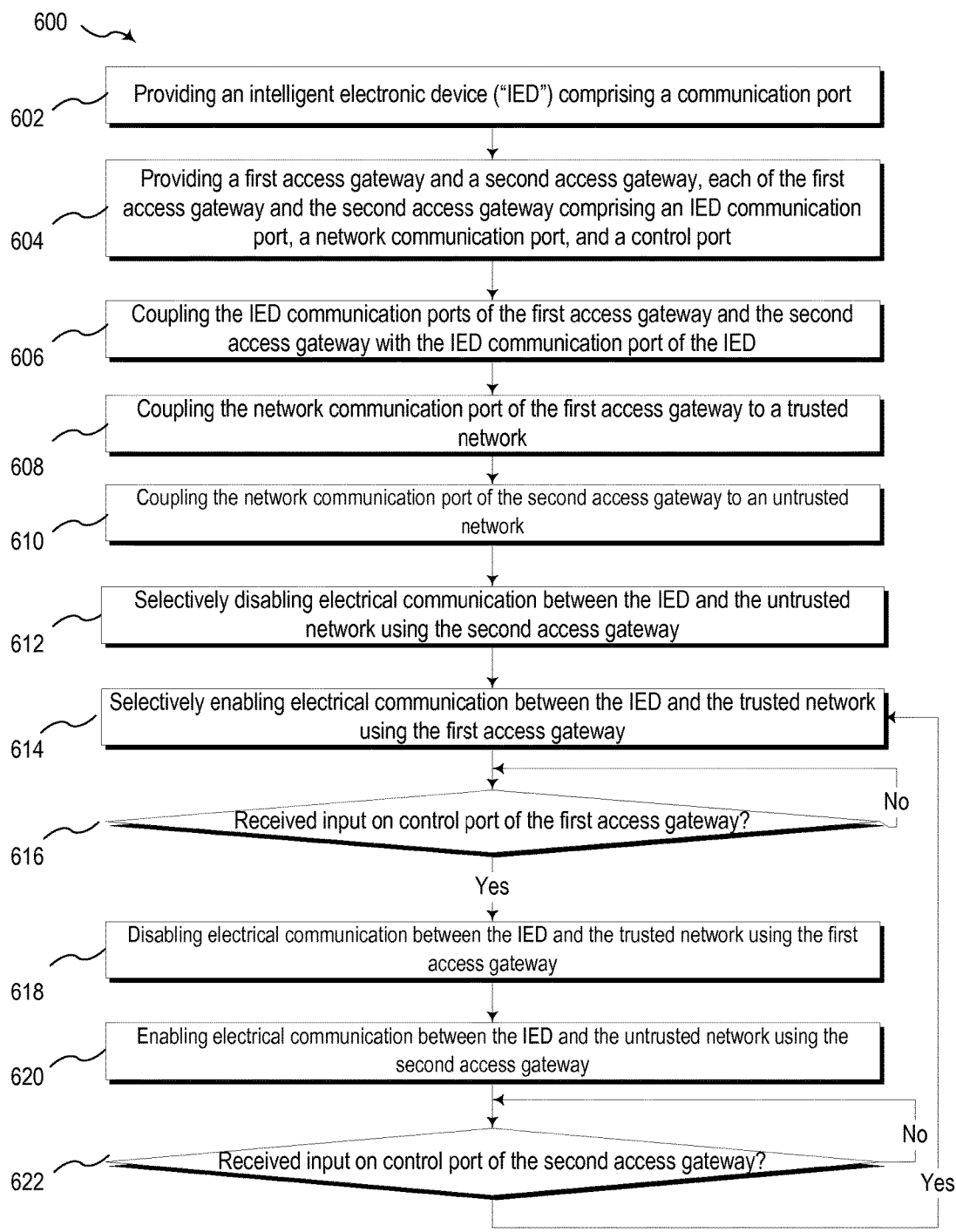
FIG. 6 illustrates a flow chart of a method for selectively connecting an IED to either a trusted network or an untrusted network using network access gateways consistent with embodiments of the present disclosure.

FIG. 6 illustrates a flow chart of a method 600 for selectively connecting an IED to either a trusted network or an untrusted network using network access gateways consistent with embodiments of the present disclosure. At 602, an IED may be provided that comprises a communication port. The IED may be embodied as a variety of devices. Certain IEDs may require period software, firmware, or settings updates that can be retrieved from an untrusted network (e.g., the Internet). Accordingly, the IED may have periodic need for communication with the untrusted network; however, security may be enhanced by limiting the time that the IED is in communication with the untrusted network. Security may also be enhanced by isolating the IED from a trusted network while the IED is in communication with the untrusted network.

At 604, a first access gateway and a second access gateway, each of which may include an IED communication port, a network communication port, and a control port may be provided. The IED communication ports of the first access gateway and the second access gateway may be coupled to the IED communication port, at 606. The network communication port of the first access gateway may be couple to a trusted network at 608, while the network communication port of the second access gateway may be coupled to an un-trusted network 610.

A system implementing method 600 may be configured to enable communication between the IED and the trusted network by default. Accordingly, at 612, electrical communication between the IED in the untrusted network may be selectively disabled by the second access Gateway. Further, at 614, electrical communication between the IED and the trusted network may be enabled using the first access gateway. The IED may remain in communication with the trusted network until an input on the control port of the first access gateway is received at 616. After receiving an input, at 618, electrical communication between the IED and the trusted network may be disabled using the first access gateway. At 620, electrical communication between the IED and the untrusted network may be enabled. Communication between the IED and the untrusted network may be enabled until an input of the enabling port of the second access gateway is received at 622. When an input is received, method 600 may return to 614.

Figure 7:
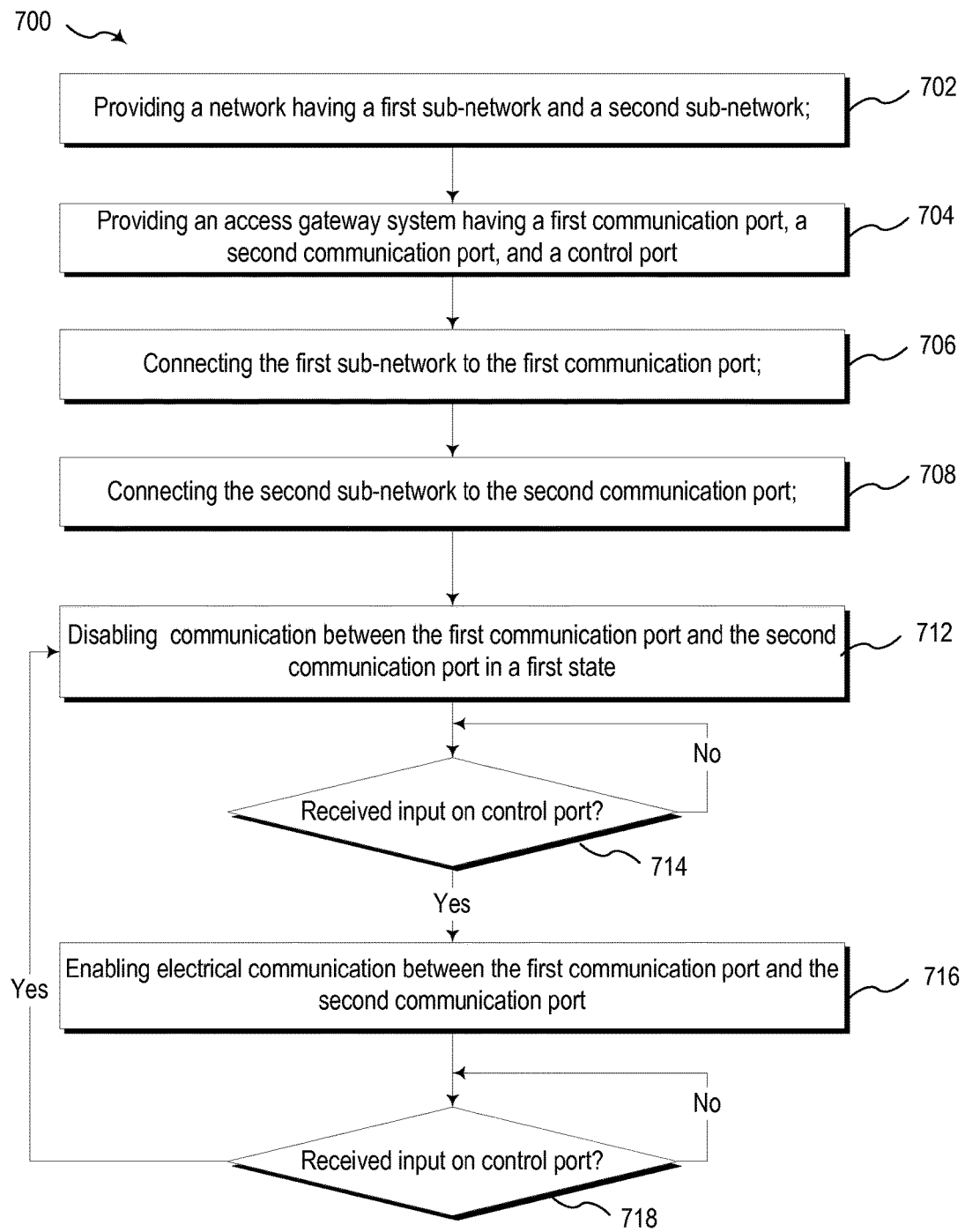
FIG. 7 illustrates a flow chart of a method for reconfiguring a network topology using network access gateways consistent with embodiments of the present disclosure.

FIG. 7 illustrates a flow chart of a method 700 for reconfiguring a network topology using network access gateways consistent with embodiments of the present disclosure. At 702 a network having a first sub-network and a second sub-network may be provided. At 704, a network access gateway having a first communication port, a second communication port, and a control port may be provided. The first sub-network may be connected to the first communication port at 706, while the second sub-network may be connected to the second communication port at 708.

At 712, electrical communication between the first communication port and the second communication port may be disabled in a first state. A system implementing method 700 may remain in the first state until an input is received on the control port at 714. After an input is received, at 716, electrical communication between the first communication port and the second communication port may be enabled in a second state. A system implementing method 700 may remain in the second state until another input is received on the control port. After input is received, at 718, method 700 may return to 712.

Figure 8B:
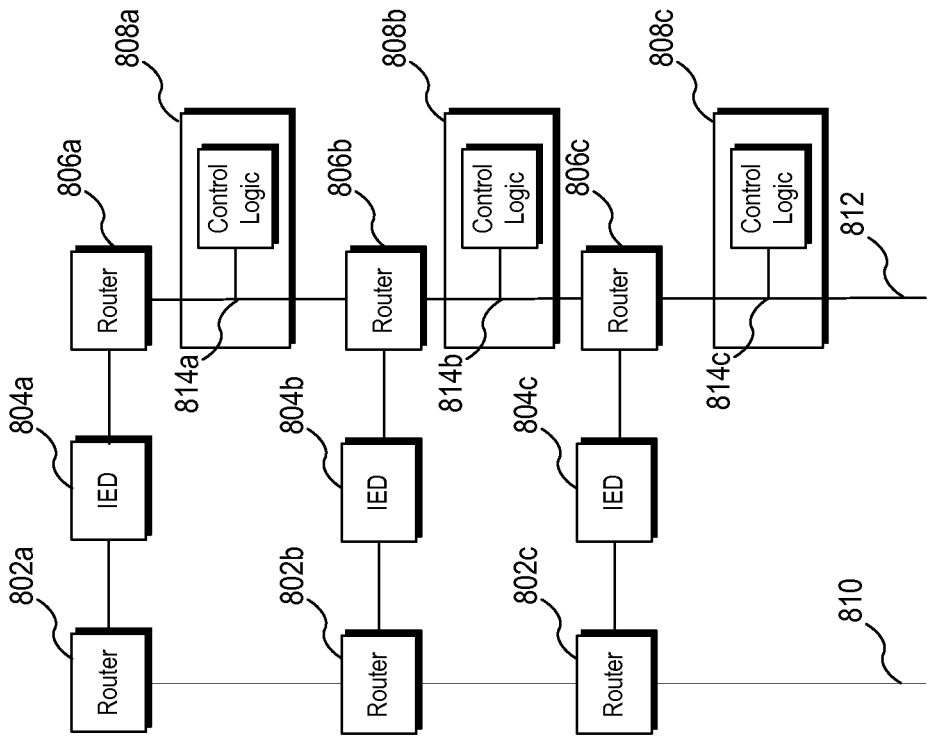
FIG. 8B illustrates a diagram of a network configured in a second topology using network access gateways consistent with embodiments of the present disclosure.
Figure 8A:
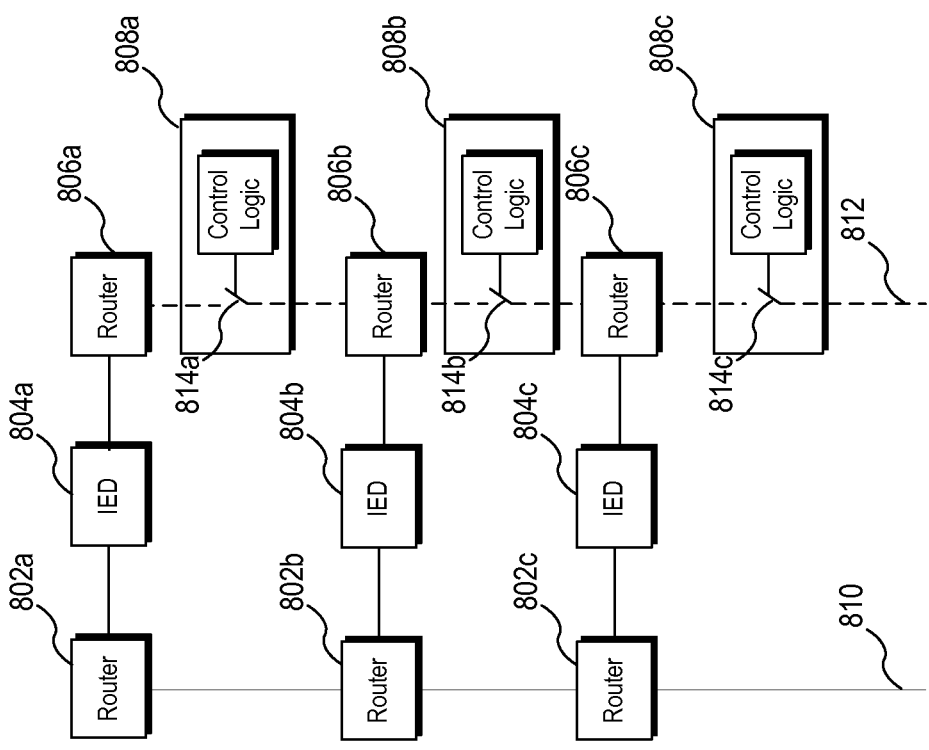
FIG. 8A illustrates a diagram of a network configured in a first topology using network access gateways consistent with embodiments of the present disclosure.

FIG. 8A illustrates a diagram of a network 800 configured in a first topology using network access gateways consistent with embodiments of the present disclosure. In the illustrated embodiment the network is configured in a ladder configuration. One side of the ladder may represent a first communication channel 810, and the other side of the ladder may represent a second communication channel 812. A plurality of routers 802a, 802b, and 802c in the plurality of network access gateways 808a, 808b, and 808c, respectively, may forward traffic along communication channel 810 or may route traffic to a plurality of IEDs 804a, 804b, and 804c, which are disposed on the "rungs" of the ladder.

In the configuration illustrated in FIG. 8A, the second communication channel 812 may be disabled by a plurality of network access gateways 808a, 808b, and 808c. Accordingly, communication channel 812 is illustrated in dashed lines and a plurality of switches 814a, 814b, and 814c are illustrated in the open position.

FIG. 8B illustrates a diagram of the network illustrated in FIG. 8A and configured in a second topology using network access gateways 808a, 808b, and 808c consistent with embodiments of the present disclosure. In the configuration illustrated in FIG. 8B communication along communication channel 812 is enabled by closing the plurality of switches 814a, 814b, and 814c in the plurality of network access gateways 808a, 808b, and 808c, respectively.

The change in network topology illustrated in FIG. 8A and FIG. 8B may allow a variety of uses. For example, engineering access to IEDs 804a, 804b, and 804c may be enabled via communication channel 812. In another example, updates to IEDs 804a, 804b, and 804c may be delivered to IEDs 804a, 804b, and 804c via communication channel 812. In yet another example, communication channel 812 may provide a redundant communication path in the event that communication channel 810 is unavailable.

While specific embodiments and applications of the disclosure have been illustrated and described, it is to be understood that the disclosure is not limited to the precise configurations and components disclosed herein. Many changes may be made to the details of the above-described embodiments without departing from the underlying principles of this disclosure. The scope of the present invention should, therefore, be determined only by the following claims.

What is claimed is:

1. A system, comprising:
   an intelligent electronic device (IED), comprising:
   a first IED communication port and
   a second IED communication port;
   a first access gateway and a second access gateway, each of the first access gateway and the second access gateway comprising:
   an IED communication port in electrical communication with one of the first IED communication port and the second IED communication port;
   a network communication port in communication with one of a trusted network and an untrusted network;
   a control port;

circuitry configured to:
disable electrical communication between the IED communication port and the network communication port based on input received from the control port in a first state, and
enable electrical communication between the IED communication port and the network communication port based on input received from the control port in a second state;
wherein the first access gateway and second access gateway are controlled such that the IED is in communication with only one of the trusted network and the untrusted network at any point in time.

2. The system of claim 1, wherein communication with the untrusted network is enabled for purposes of retrieving updates for software programs run by the IED.

3. The system of claim 1, wherein communication with the untrusted network is enabled for purposes of allowing engineering access to the IED.

4. The system of claim 1, wherein communication with the untrusted network is enabled according to a schedule.

5. The system of claim 1, wherein at least one of the first IED communication port, the second IED communication port, and the network communication port comprises an Ethernet communication port.

6. The system of claim 1, wherein the circuitry configured to disable electrical communication between the IED communication port and the network communication port comprises an RF relay.

7. The system of claim 1, wherein the circuitry comprises one of a field programmable gate array, an application specific integrated circuit, a transistor, and a latch transistor.

8. The system of claim 1, further comprising:
a manual override configured to toggle between the first state and the second state.

9. A method, comprising:
providing an intelligent electronic device (IED) comprising a communication port;
providing a first network access gateway and a second network access gateway, each of the first network access gateway and the second network access gateway comprising an IED communication port, a network communication port, and a control port;
coupling the IED communication ports of the first network access gateway and the second network access gateway with the IED communication port of the IED;
coupling the network communication port of the first network access gateway to a trusted network;
coupling the network communication port of the second network access gateway to an untrusted network;
disabling electrical communication between the IED and the untrusted network using the second network access gateway while enabling electrical communication between the IED and the trusted network using the first network access gateway in a first state;
receiving an input on the control port of at least one of the first network access gateway and the second network access gateway; and
disabling electrical communication between the IED and the trusted network using the first network access gateway while enabling electrical communication between the IED and the untrusted network using the second network access gateway in a second state.

10. The method of claim 9, further comprising:
retrieving updates for software programs run by the IED in the second state.

11. The method of claim 9, further comprising:
allowing engineering access to the IED in the second state.

12. The method of claim 9, wherein transitioning between the first state and the second state is based on a schedule.

13. The method of claim 9, wherein electrical communication between the IED and the untrusted network in the second state comprises interrupting electrical communication at a physical layer in the second network access gateway.

14. A network access gateway, comprising:
a first communication port in communication with a trusted network;
a second communication port in communication with an untrusted network;
a time system to selectively open a communication window according to a schedule; and
a control port configured to receive input from the time system, the time system configured to selectively open a communication window based on a schedule;
control logic in communication with the first communication port, the second communication port, and the control port and configured to:
interrupt electrical communication between the first communication port and the second communication port based on input received from the control port in a first state, and
enable electrical communication between the first communication port and the second communication port based on input received from the control port in a second state to permit concurrent communication between the trusted network and the untrusted network;
wherein the schedule reduces an opportunity to gain unauthorized access to the trusted network through the untrusted network to the communication access window.

15. The access gateway of claim 14, wherein the control port is configured to receive input from a supervisory control and data acquisition (SCADA) system.

16. The access gateway of claim 14, wherein at least one of the first communication port and the second communication port comprise an Ethernet communication port.

17. The access gateway of claim 14, wherein at least one of the first communication port and the second communication port comprises at least one of a fiber-optic port, a serial port, a communication radio port, a parallel port, a USB port, and an IEEE 1394 port.

18. The access gateway of claim 14, wherein the control logic comprises circuitry configured to interrupt electrical communication between the first communication port and the second communication port at a physical layer.

19. The access gateway of claim 14, wherein the control logic comprises circuitry configured to enable a high speed relay that creates an air gap between the first communication port and the second communication port.

20. The access gateway system of claim 14, wherein the circuitry is configured to interrupt electrical communication between at least one of a transmit pin and a receive pin of at least one of the first Ethernet communication port and the second Ethernet communication port.

21. The access gateway system of claim 14, wherein the control port comprises a latch configured to toggle between the first state and the second state based on input from the control port and to maintain one of the first state and the second state until a new input is received.

22. The access gateway system of claim 21, further comprising an output configured to generate an output signal associated with one of an indicator, annunciator, and an alarm.

23. The access gateway system of claim 14, further comprising a mode indicator configured to provide a first visual indication in the first state and to provide a second visual indication in the second state.

24. The access gateway system of claim 14, further comprising a manual override configured to toggle between the first state and the second state.

25. The access gateway system of claim 14, wherein the access gateway system is configured to be embedded within an intelligent electronic device.

26. A method of using a network access gateway, the method comprising:
    providing a network access gateway, the network access gateway comprising:
        a first communication port in communication with a trusted network;
        a second communication port in communication with an untrusted network;
        a time system to selectively open a communication access window according to a schedule;
        a control port configured to receive input from the time system, the time system configured to selectively open a communication access window according to a schedule and to reduce an opportunity to gain unauthorized access to the trusted network from the untrusted network to the communication access window; and
        control logic in communication with the first communication port, the second communication port;
    interrupting electrical communication between the first communication port and the second communication port based on input received from the control port in a first state, and
    enabling electrical communication between the first communication port and the second communication port based on input received from the control port in a second state to permit concurrent communication between the trusted network and the untrusted network.

* * * * *